United States Patent Office 3,216,705
Patented Nov. 9, 1965

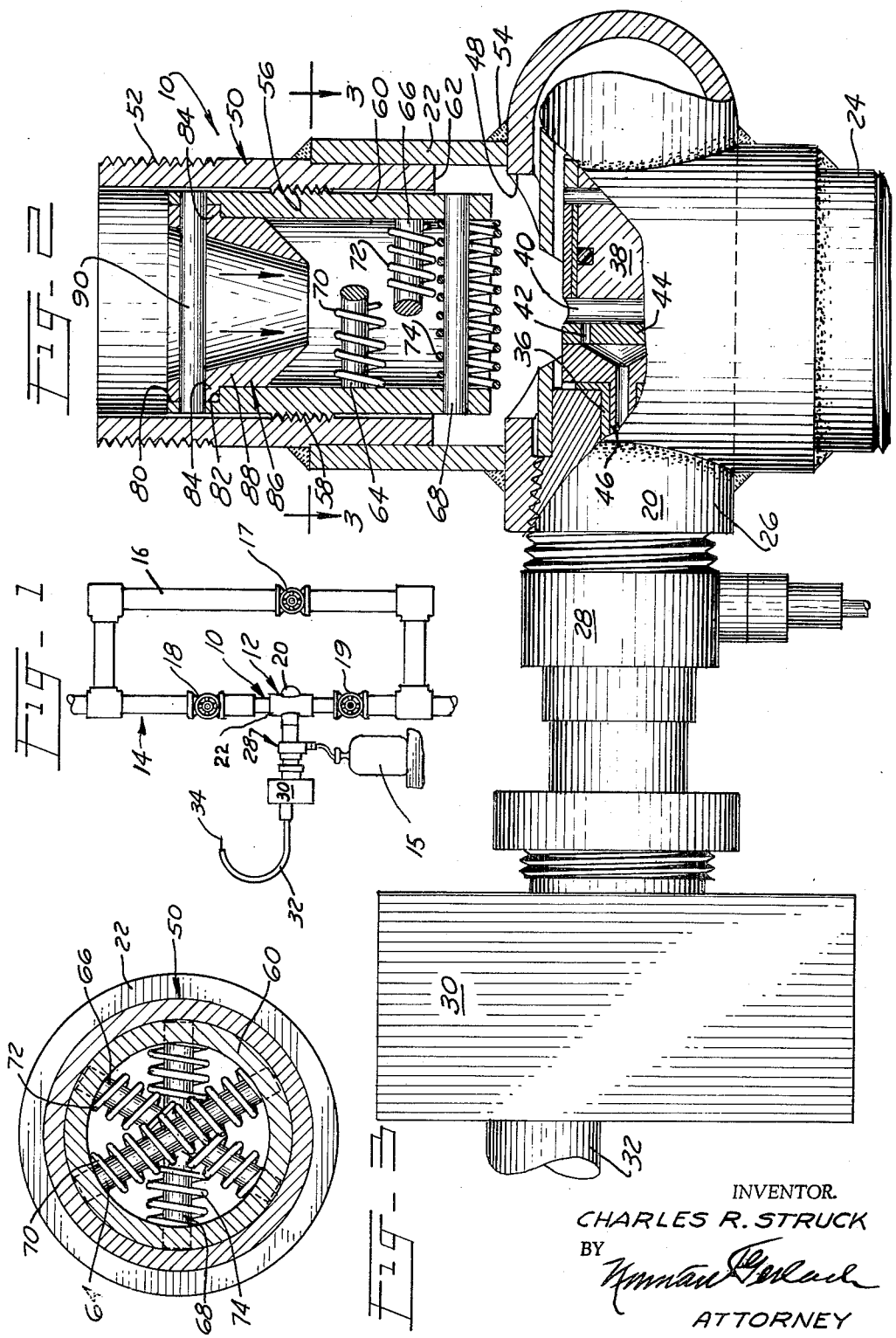

1

3,216,705
FLUID MIXING DEVICE
Charles R. Struck, Santa Barbara, Calif., assignor to True-Cut Products, Inc., Goleta, Calif., a corporation of California
Filed May 19, 1964, Ser. No. 368,631
11 Claims. (Cl. 259—4)

The improved fluid mixing device comprising the present invention is designed for use primarily in connection with a fluid sampling device of the type that is shown and described in my copending United States patent application Serial No. 268,752, filed on March 28, 1963 and entitled "Fluid Sampling Device." The invention is, however, capable of other uses and a fluid mixing device constructed according to the principles of this invention may find a wide variety of uses in other fields as, for example, in connection with the mixing of fluid fuels emanating from a fuel proportioning valve and flowing to a burner or in connection with the chlorination or fluoridation of water. In fact, the mixing device of the present invention may be found useful in connection with the blending of two or more fluids, or the blending of a fluid with a solid where a suspension is to be formed, regardless of the nature of the fluid or the solid, or of the use to which the blended mixture is to be put. Irrespective, however, of the particular use to which the present invention may be put, the essential features thereof are at all times preserved.

The fluid sampling device of my above-mentioned patent application operates repetitively to remove small representative quantities or samples of a mixture of different fluids from a flow line for the purpose of chemical analysis. When the device is installed in a flow line at a small distance downstream from the point where the mixing of the different fluids takes place, it is obvious that, unless a thorough mixing of the fluids is effected before the fluids reach the point of withdrawal, that is, the sampling device, the withdrawn samples will not be truly representative of the mixture. The present invention provides an extremely simple and compact fluid mixing device which, as an article of hardware, is adapted to be interposed in a pipe line between adjacent pipe sections to the end that it will, in itself, constitute a section of the pipe line and when so interposed it will create an effective condition of turbulence in the pipe line and cause thorough intermixing of the fluids passing through the line.

The provision of such a device constituting the principal object of the invention, it is a further object to provide a mixing device which requires for its mixing action no outside source of power, fluid mixing taking place automatically under the sole impetus of movement of the fluids through the pipe line.

The provision of a fluid mixing device which, except for a slight looseness of certain of its internal parts, is devoid of relatively moving or rotating parts and, therefore, is unlikely to get out of order; one which is rugged and durable and, therefore, is possessed of a long life; one which requires no adjustment for its proper operation; one which is smooth and silent in its operation; and one which, otherwise, is well adapted to perform the services required of it, are further desirable features which have been borne in mind in the production and development of the present invention.

Other objects and advantages of the invention, not at this time enumerated, will become readily apparent as the following description ensues.

In the accompanying single sheet of drawings forming a part of this specification, one illustrative embodiment of the invention is shown.

2

In these drawings:
FIG. 1 is a side view of a fluid sampling installation showing the improved fluid mixing device operatively installed therein;
FIG. 2 is an enlarged vertical sectional view taken centrally through the improved fluid mixing device and showing the sampling device proper partly in section and partly in side elevation; and
FIG. 3 is a horizontal sectional view taken substantially along the line 3—3 of FIG. 2.

Referring now to the drawings in detail and in particular to FIG. 1, the fluid mixing device of the present invention is designated in its entirety by the reference numeral 10 and, to external appearances, it resembles a short length or section of pipe. For exemplary environmental purposes, the device 10 is shown as being operatively installed in a fluid sampling installation wherein a dispensing apparatus in the form of a self-contained motor-driven sampling device 12 withdraws representative quantities or samples of a mixture of fluids from a flow line 14 and deposits the same in a receptacle 15 for subsequent analysis.

One end of the sampling device 12 is inteposed in the flow line 14 and the mixture of fluids is adapted to be by-passed around the device 12 by way of a sectional branch conduit 16 having a manually controlled valve 17 interposed therein. Two shut-off valves 18 and 19 are disposed in the flow line 14 on opposite sides of the sampling device 12. When these two valves are closed and the valve 17 is opened, fluid mixture will pass through the branch conduit 16 and by-pass the sampling device 12. When the two valves 18 and 19 are opened and the valve 17 is closed, the fluid mixture will pass through the flow line 14 for cooperation with the device 12.

The fluid sampling installation and the motor-driven sampling device 12 that is associated with it constitute no part of the present invention and no claim is made herein to any novelty in them. The installation is illustrated herein solely as an exemplary environment for the fluid mixing device 10 of the present invention. For a full disclosure of the fluid sampling device 12, reference may be had to my aforementioned copending application. For descriptive purposes herein, it is deemed sufficient to state, briefly, that the sampling device 12 includes a generally T-shaped outer casing 20 having aligned upper and lower legs 22 and 24 and a transverse leg 26. The legs 22 and 24 of the casing are connected to and form a part of the flow line 14 and the transverse leg 26 is connected to a composite tubular sleeve structure 28 which is attached to a gear reduction box 30 having a flexible lead-in driving connection 32 for a drive cable 34. The output of the gear reduction box 30 is operatively connected to an elongated delivery tube 36 which is rotated in timed relation to the reciprocating or pumping action of a piston 38. The latter is reciprocated in a chamber 40 and forces the fluid mixture through a port 42 in a valve disk 44 for delivery through the central bore 46 of the delivery tube 36 to the receptacle 16, all in a manner set forth in my aforementioned copending application.

In order to insure intimate mixing of the fluid constituents which make up the fluid mixture flowing through the flow line 14 immediately prior to delivery of the mixture to the sampling device 12 so that the samples that are withdrawn from the flow line by the device will be truly representative of the relative proportions of these constituents, the mixing device 10 of the present invention is positioned in the flow line immediately ahead of the sampling device 12 and in direct communication with an upwardly facing inlet opening 48 which is formed in the upper portion of the casing 20 and leads to the interior of the casing. The mixing device 10 involves in its general organization an open-ended tubular cylindrical casing 50 which is disposed vertically in the illustrated sampling installation and has the upper end thereof exteriorly threaded as at 52 for threaded reception within the lower end of the casing of the shut-off valve 18. The lower end of the casing 50 is telescopically received in the upper leg 22 of the casing 20 and is welded in position therein as indicated at 54.

A short medial section 56 of the tubular casing 50 is interiorly threaded and receives the upper exteriorly threaded end 58 of a vertically extending inner mixing tube 60. The lower end of the tube 60 projects a slight distance below the lower rim 62 of the tubular casing 50.

At a region below the interiorly threaded section 56 of the casing 50 and at three vertically spaced elevations, three transverse spring-supporting cross rods 64, 66 and 68 extend diametrically across the tube 60 and assume horizontal directions whereby each rod extends at an angle of 60° to each other rod or, stated otherwise, whereby the vertical projections of the cross rods provide a six-arm spider (see FIG. 3). The ends of the rods are fixedly secured in pairs of diametrically opposite holes in the side wall of the inner mixing tube 60.

Each of the cross rods 64, 66 and 68 constitutes a support for a helically wound spring, the three springs being designated by the reference numerals 70, 72 and 74. The springs are of greater diameter than the diameters of the rods on which they are supported. They extend completely across the tube 60 and are loosely supported on the rods. Since the spring 74 is offered no interference by the two other springs, it may be made of somewhat greater diameter than the springs 70 and 72. The rods and springs constitute baffle members for dispersing and effecting turbulence of the fluid mixture which passes downwardly through the tube 60.

The upper rim of the tube 60 is formed with an internal recess 80 and this establishes an annular seating shoulder 82 which receives and supports thereon a head flange 84. The latter is formed at the upper end of a funnel-shaped, jet-producing fluid accelerator or nozzle member 86, the body portion 88 of which is telescopically received with the upper end of the tube 60. A cross-pin 90 projects across the entrance or mouth of the nozzle member 86. It extends radially beyond the confines of the nozzle member and has its ends fixedly secured in diametrically opposite holes in the side wall of the tube 60, thus securing the nozzle member in position within the tube. The cross-pin 90 serves as a reaction torque rod for reception thereover of a forked or furcated tool or the like whereby the tube 60 may be inserted into and removed from the casing 50 when desired.

In the operation of the fluid mixing device 10, during flow of the fluid mixture therethrough, the function of the funnel-shaped accelerator or nozzle member 86 is to increase the velocity of the mixture entering the tube 60 so that greater turbulence will be established within the tube when the fluid mixture impinges against the loosely disposed springs 70, 72 and 74. With this increased turbulence, the springs destroy any flow pattern which otherwise might be set up within the tube. Although the springs offer an appreciable degree of fluid dispersion and establish pronounced turbulence within the tube 60, they do not appreciably restrict the flow of the mixture through the tube. Furthermore, the springs allow coarse solids to pass through the tube without opposition inasmuch as the springs which may oppose such solids will part, so to speak, due to their loosely supported nature and release the solids to the stream. Finally, there is no abrupt direction change of any appreciable volume of the fluid mixture passing through the tube so line resistance remains low.

The invention is not to be limited to the exact arrangement of parts shown in the accompanying drawings or described in this specification as various changes in the details of construction may be resorted to without departing from the spirit or scope of the invention. For example, whereas the tube 60 has been shown and described herein as having three spring-supporting rods associated therewith, it is within the purview of the invention to provide a greater or a lesser number of such rods. Furthermore, it is contemplated that the outer casing 50 of the fluid mixing device may be modified in any suitable manner to accommodate its connection to adjacent elements or sections of a fluid flow line. For example, if both adjacent elements of a flow line are provided with internal threads, it is obvious that the end regions of the tubular casing 50 may be externally threaded for connection to such internally threaded elements. Under certain circumstances, it may be desired to flange one or both ends of the casing 50 to enable a bolted connection to an adjacent element or elements of a flow line. Therefore, only insofar as the invention has particularly been pointed out in the accompanying claims is the same to be limited.

Having thus described the invention what I claim as new and desire to secure by Letters Patent is:

1. A fluid mixing device comprising an open-ended cylindrical tubular member adapted to have its ends sealingly connected to adjacent sections of a fluid flow line so that the member itself constitutes a section of such flow line, a cross rod extending diametrically across said member in the medial region thereof, and a helical spring encompassing said cross rod and loosely supported thereon.

2. A fluid mixing device as set forth in claim 1 and wherein the helical spring is substantially coextensive with said cross rod.

3. A fluid mixing device as set forth in claim 1 and wherein the helical spring is of a diameter appreciably greater than the diameter of the cross rod, and the spring is substantially coextensive with the cross rod.

4. A fluid mixing device comprising an open-ended cylindrical tubular member adapted to have its opposite ends sealingly connected to adjacent sections of a fluid flow line so that the member itself constitutes a section of such flow line, a plurality of cross rods extending diametrically across said member at different longitudinal regions therealong, and a helical spring encompassing each cross rod and loosely supported thereon.

5. A fluid mixing device as set forth in claim 4 and wherein each spring is substantially coextensive with the cross rod upon which it is mounted.

6. A fluid mixing device as set forth in claim 5 and wherein each helical spring is of a diameter appreciably greater than the diameter of the cross rod upon which it is supported and also each spring is substantially coextensive with the cross rod upon which it is mounted.

7. A fluid mixing device as set forth in claim 5 and wherein a planar axial projection of all of said cross rods establishes an equi-angular radial arm spider pattern.

8. A fluid mixing device as set forth in claim 5 and wherein the cross rods are three in number, and a planar axial projection of the three cross rods establishes a 60° equi-angular radial arm spider pattern.

9. A fluid mixing device comprising an open-ended cylindrical tubular member adapted to have its ends sealingly connected to adjacent sections of a fluid flow line so that the member itself constitutes a section of such flow line, a plurality of cross rods extending diametrically across said member at different longitudinal regions therealong, a helical spring encompassing each cross rod and loosely supported thereon, each spring being substantially coextensive with the cross rod on which it is mounted, a planar axial projection of all of said cross rods establishing an equi-angular radial arm spider pattern, and a funnel-like jet-producing nozzle member mounted within said tubular member adjacent to one open end thereof and having its small end centered within the tubular member for directing a jet of fluid against the medial region of the first cross rod and the spring supported thereby.

10. A fluid mixing device comprising in combination an open-ended cylindrical outer casing adapted to have its ends sealingly connected to adjacent sections of a fluid flow line so that the casing itself constitutes a section of such flow line for entry of fluid through one end thereof and discharge of fluid through the other end thereof, a medial section of said casing being internally threaded, an inner open-ended cylindrical mixing tube having an externally threaded medial section threadedly received within the internally threaded section of the casing whereby the tube and casing are disposed in nested telescopic relationship, a plurality of cross rods extending diametrically across said tube at different longitudinal regions therealong, a helical coil spring encompassing each cross rod and loosely supported thereon, each spring being substantially coextensive with the cross rod on which it is mounted, a planar axial projection of all of said cross rods establishing an equi-angular radial arm spider pattern, a funnel-like jet-producing nozzle member mounted within said mixing tube adjacent to one open end thereof and having its small end centered within the tube for directing a jet of fluid against the medial region of the first cross rod and the spring supported thereby, and a reaction torque rod extending diametrically across the large end of said funnel-like nozzle member and designed for reception thereover of a forked tool whereby the mixing member may be threadedly inserted into and removed from the outer casing.

11. A fluid mixing device as set forth in claim 10 and wherein said torque rod projects completely through the funnel-like nozzle member and has its ends secured in the side wall of the mixing tube, thus serving to retain the nozzle member in position within the mixing tube.

References Cited by the Examiner
FOREIGN PATENTS

| | | |
|---|---|---|
| 738,061 | 10/32 | France. |
| 1,764,438 | 7/35 | Switzerland. |

CHARLES A. WILLMUTH, *Primary Examiner.*